United States Patent [19]
Waldman

[11] Patent Number: 5,269,691
[45] Date of Patent: Dec. 14, 1993

[54] STICKER ACTIVITY AND COLORING BOOK

[75] Inventor: Sandra Waldman, North York, Canada

[73] Assignee: Marnlen Management Ltd., Markham, Canada

[21] Appl. No.: 991,271

[22] Filed: Dec. 16, 1992

[51] Int. Cl.$^5$ .............................. G09B 11/00
[52] U.S. Cl. ................... 434/429; 434/428; 434/81; 434/96; 40/594
[58] Field of Search .............. 434/96, 80, 428, 429, 434/430, 81; 40/594–630, 638

[56] References Cited

U.S. PATENT DOCUMENTS

| | | | |
|---|---|---|---|
| 1,942,339 | 1/1934 | Lawrence | 434/96 |
| 3,094,791 | 6/1963 | Thiebes | 434/96 |
| 3,715,816 | 2/1973 | White | 40/594 X |
| 3,849,913 | 11/1974 | Williams, Sr. | 40/594 X |
| 3,855,714 | 12/1974 | Block | 40/594 X |
| 4,250,642 | 2/1981 | Riehle | 434/80 X |
| 4,714,275 | 12/1987 | Engel et al. | 40/594 X |

OTHER PUBLICATIONS

*Cut-Outs To Help In Planning;* U.S. Department of Agriculture Misc. Pub. No. 622; May 1947.

*Primary Examiner*—John J. Wilson
*Assistant Examiner*—L. Thomas
*Attorney, Agent, or Firm*—Bereskin & Parr

[57] ABSTRACT

A sticker book having at least three sheets. Each sheet is double-sided and can be folded at its center to form twelve pages. One sheet is printed on both sides with colored scenes forming four scene pages on which stickers may be placed. The remaining two sheets each contain, on one side thereof, two pages of die-cut stickers, each page corresponding to a scene page. On the other sides of such remaining sheets are printed instructional pages in black and white, showing how the stickers can be placed on the scene pages. The instructional pages have a surface adapted to be colored. On assembly, the scene sheet is sandwiched between the sticker-/instructional sheets and the three sheets are folded to form at least a twelve-page combined sticker activity and coloring book which can be used both to entertain and to teach a child.

6 Claims, 8 Drawing Sheets

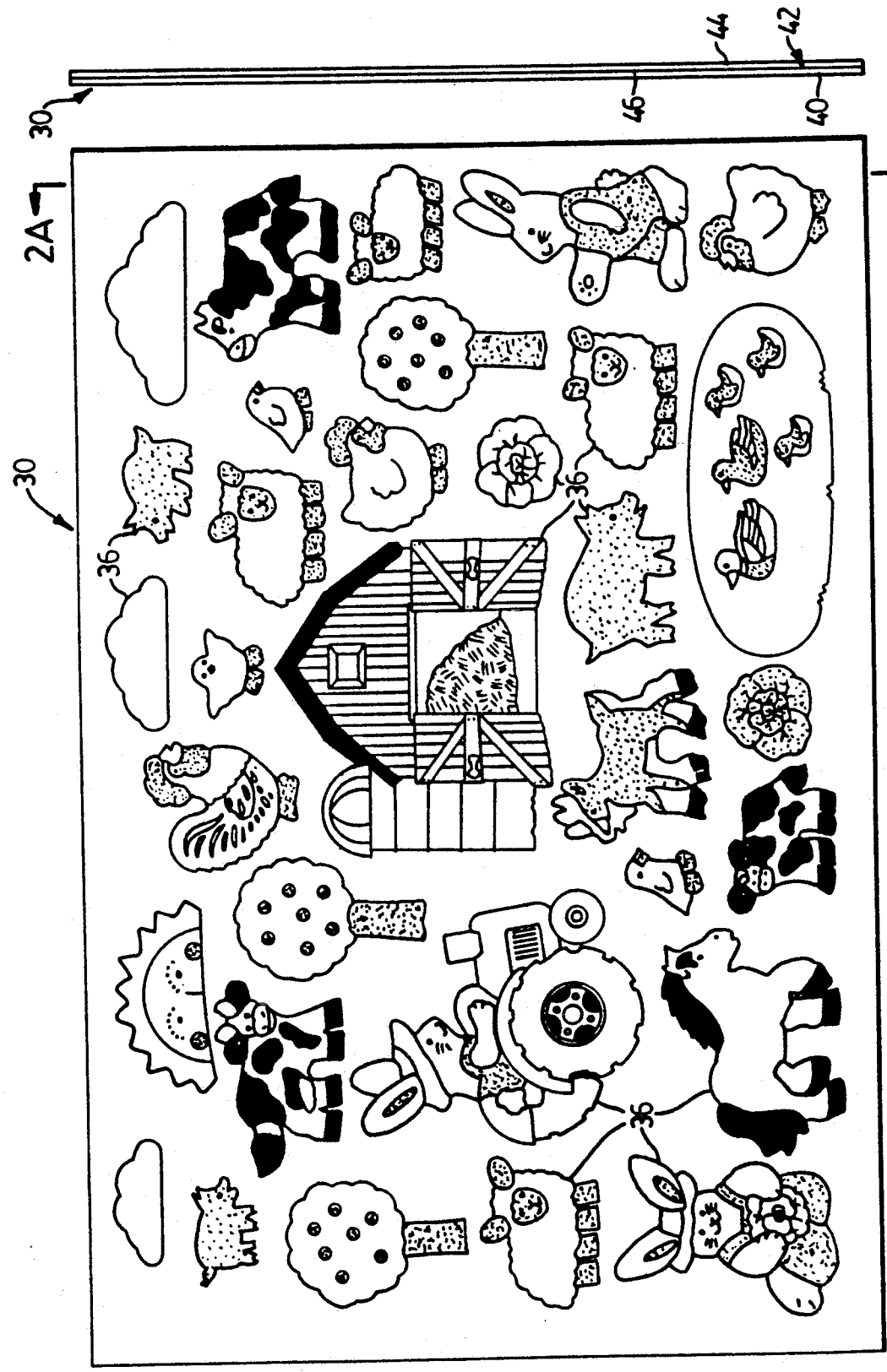

STICKER ACTIVITY AND COLORING BOOK

FIELD OF THE INVENTION

This invention relates to a sticker book for children.

BACKGROUND OF THE INVENTION

Stickers are produced in various shapes, sizes and colors and are a common form of entertainment for children. The stickers when sold are normally located on a backing sheet, and in use they are removed from such sheet and are stuck elsewhere, for example on another sheet of paper, or on an article of clothing, or on lunch boxes, school books, letters or on any other personal objects.

In the past, while stickers have served as a form of entertainment, their educational potential has not been recognized. Little attention has been paid to providing child users with guidance concerning the placement of stickers, to arrive at a desired design or result.

It is therefore an object of the invention to provide a sticker book which is efficiently organized and which, depending on the subject matter chosen, can provide a substantial educational component when used.

SUMMARY OF THE INVENTION

In one embodiment the present invention provides a sticker activity and coloring book comprising:
(i) a sticker page containing a plurality of removable adhesively backed stickers;
(ii) a scene page associated with said sticker page and having a scene printed in color thereon and a release coating for receiving said stickers;
(iii) an instructional page associated with said sticker and scene pages and showing, in black and white outline, said scene on said scene page and one arrangement of said stickers on said scene; so that a user of said book may remove one of said stickers from said sticker page and transfer said sticker onto said scene page as shown on said instructional page, and said transfer may continue until all of said stickers have been placed on said scene page;
(iv) said instructional page having a surface adapted to receive coloring from a coloring instrument, so that said instructional page may be colored by said user.

In another aspect of the invention, there is provided a method of using a sticker activity and coloring book comprising the steps of:
(i) removing a sticker from a sticker page of said sticker book;
(ii) placing said sticker on a color scene located on a scene page of said book by following instructions for said placement on an instructional page of said book which shows in black and white outline one arrangement of said stickers on said scene;
(iii) repeating steps (i) and (ii) until all of said stickers have been removed from said sticker page and have been placed on said scene page;
(iv) and coloring at least a portion of said instructional page.

BRIEF DESCRIPTION OF THE DRAWINGS

Embodiments of the invention will now be described, by way of example only, with reference to the accompanying drawings, in which:

FIG. 2 is a plan view of a sticker page of the book of FIG. 1;

FIG. 2A is a cross section along the line 2A—2A of the sticker page of FIG. 2;

DESCRIPTION OF PREFERRED EMBODIMENTS

Figure 1:
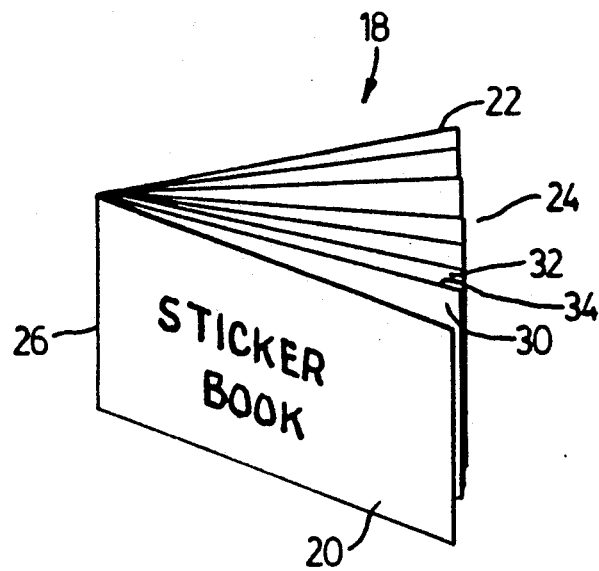
FIG. 1 is a perspective view of a sticker activity and coloring book according to the present invention.

Reference is first made to FIG. 1 which shows a sticker activity and coloring book 18 having front and back covers 20, 22 and a number of pages in between, generally indicated by the reference numeral 24. The covers 20, 22 are joined along a spine 26, and the pages 24 are joined to the spine 26 using any suitable means, such as staples or glue (not shown in FIG. 1). The covers 20, 22 are constructed of a relatively stiff paper, for example a paper supplied by Intercity Paper and known as "stock 10 point coated 1 side tag" which is then laminated with a 1.0 mil. clear laminate on the surfaces which are to serve as its outer surfaces. It is customary to place a title on the front cover 20 and any desired graphics on both surfaces of both covers.

Figure 3:
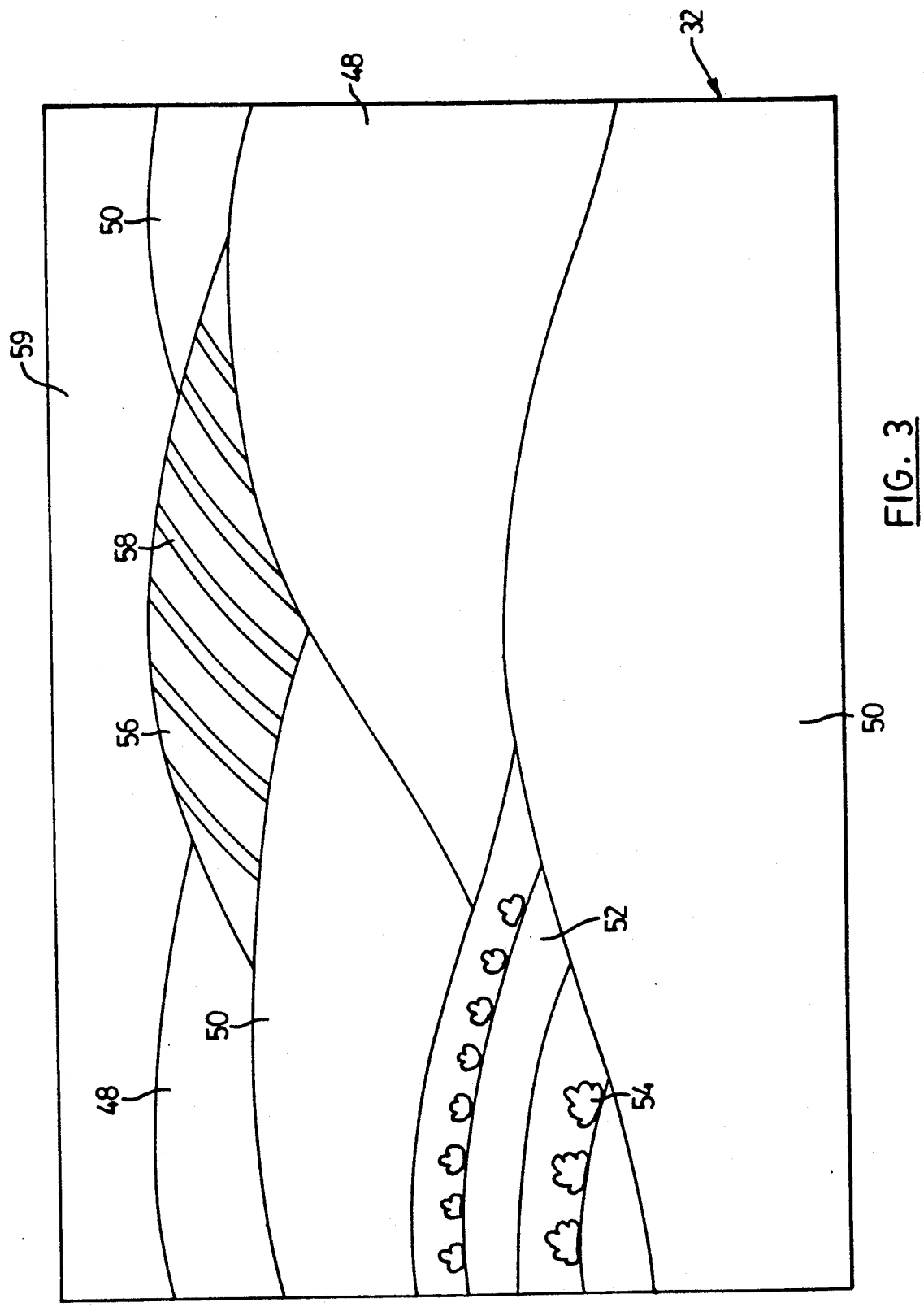
FIG. 3 is a plan view of a scene page of the book of FIG. 1.
Figure 4:
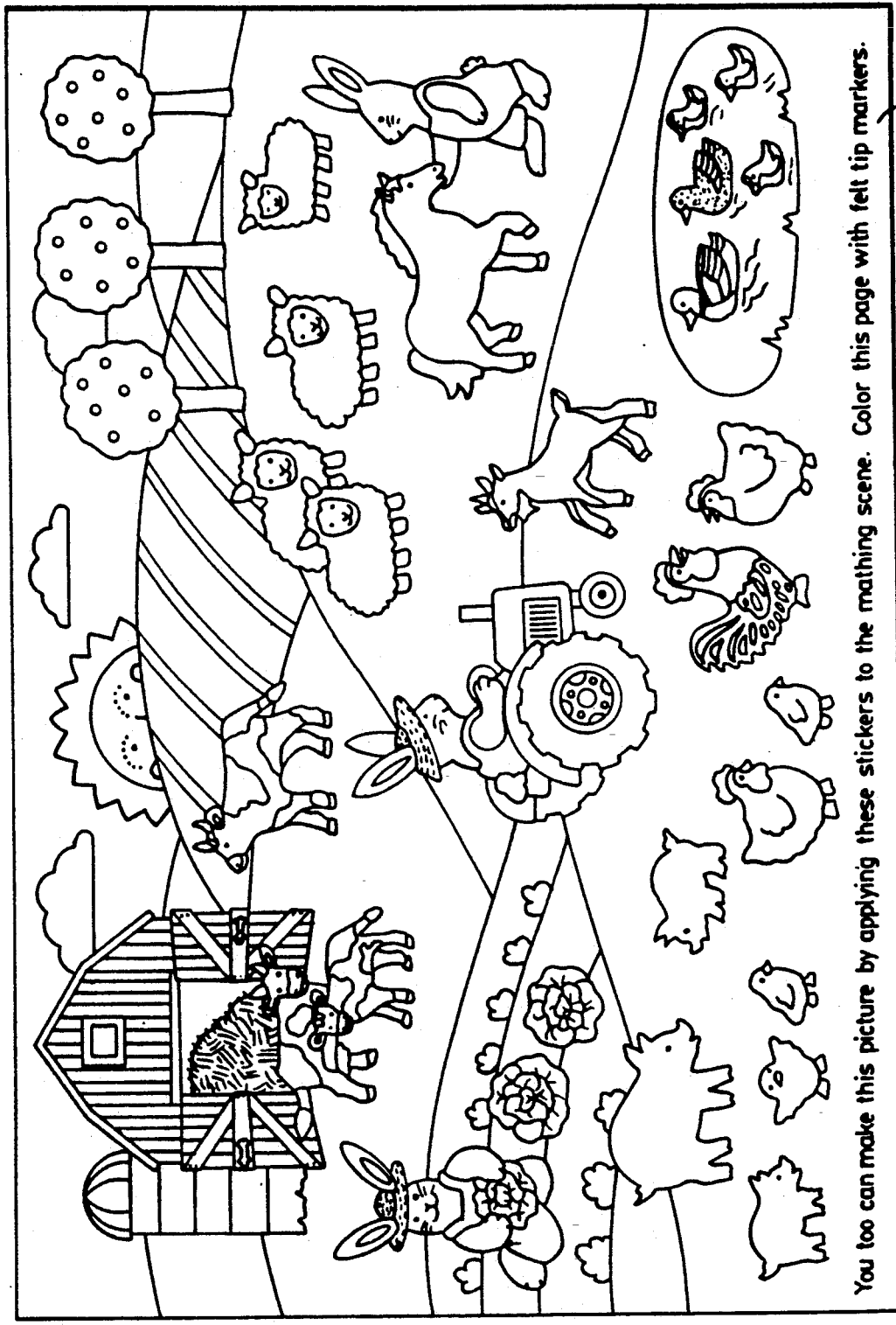
FIG. 4 is a plan view of an instructional page of the book of FIG. 1.
Figure 5:
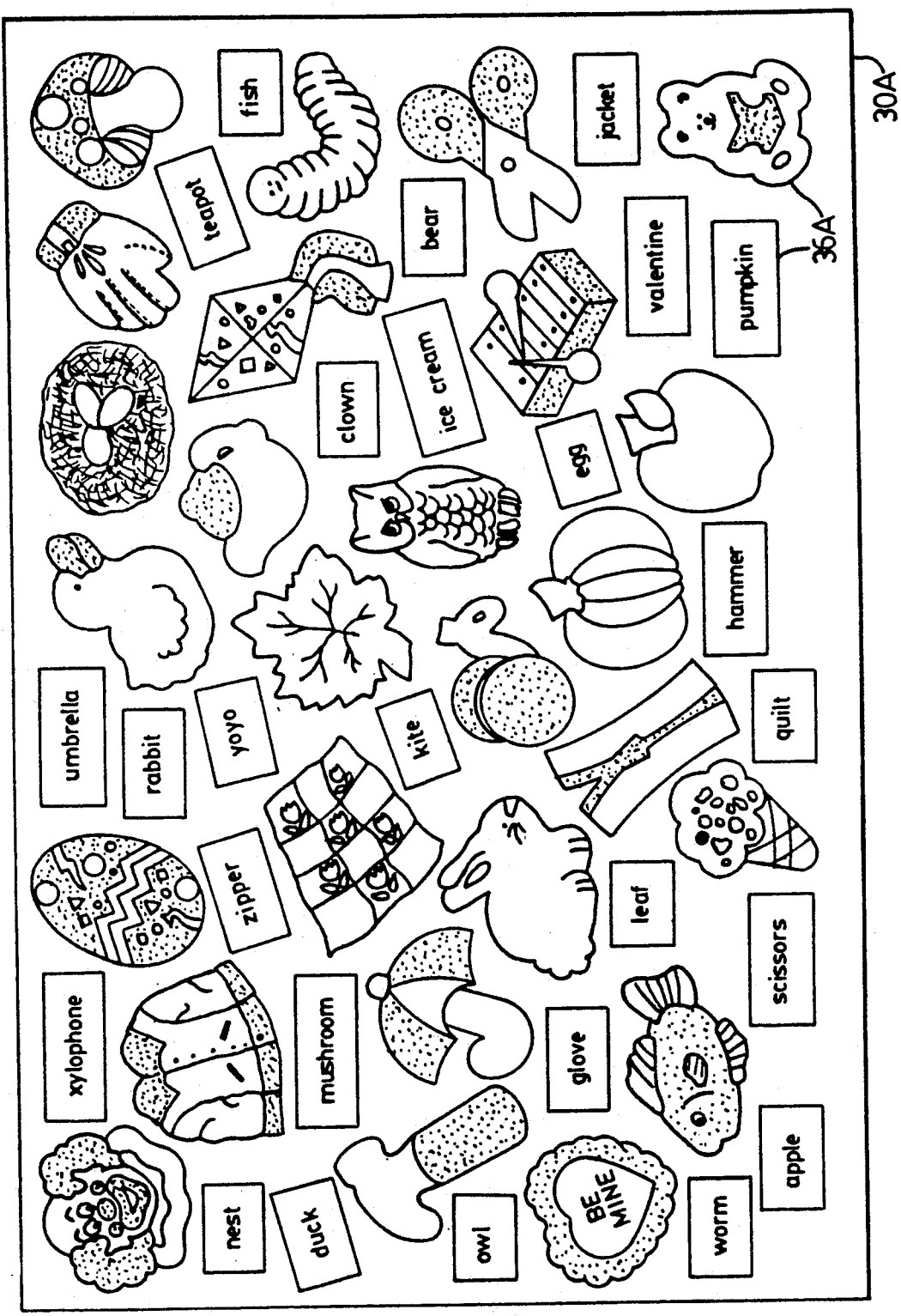
FIG. 5 is a plan view of a first alternate embodiment of the sticker page of FIG. 2.
Figure 6:
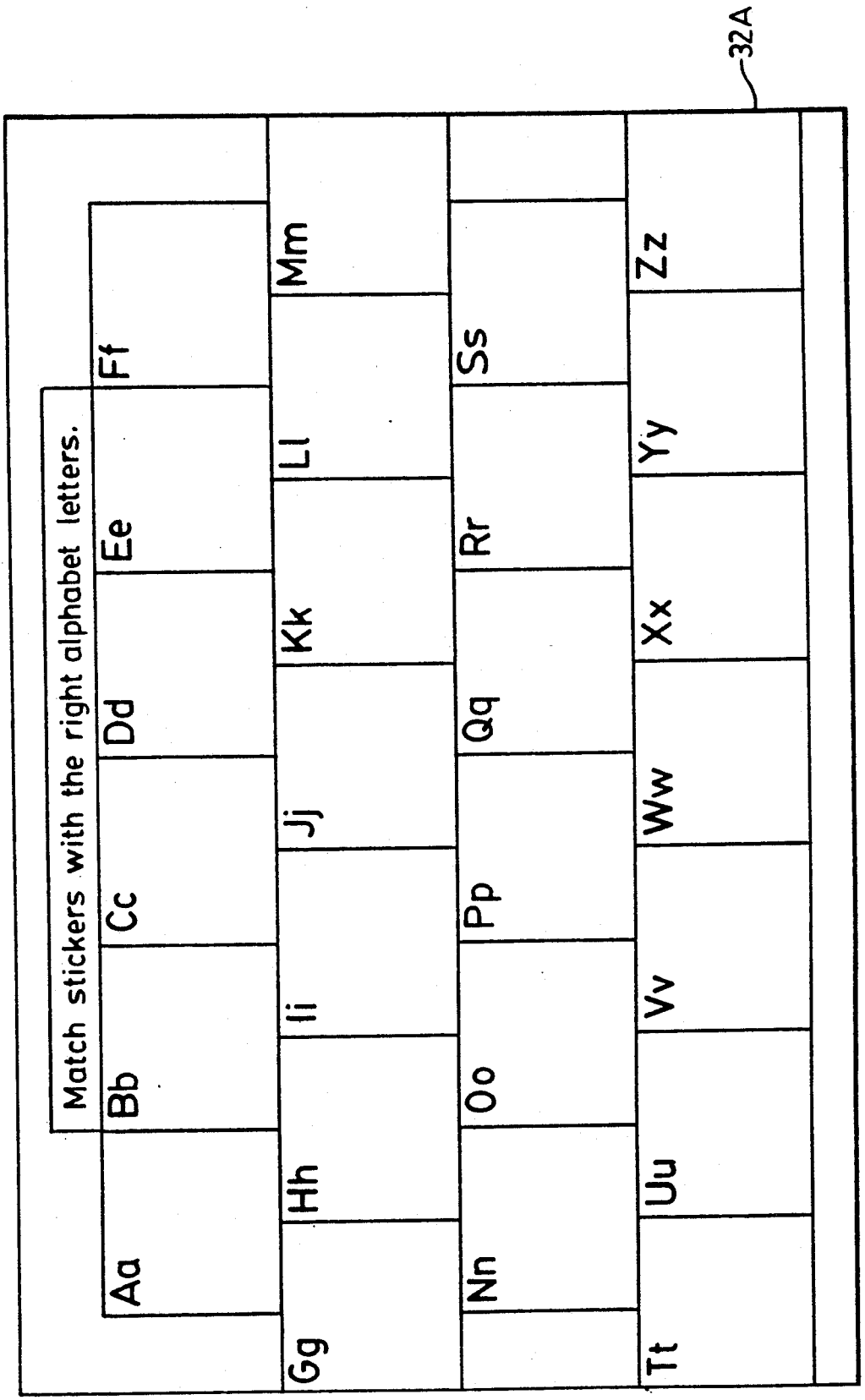
FIG. 6 is a plan view of a first alternate embodiment of the scene page of FIG. 3.
Figure 7:
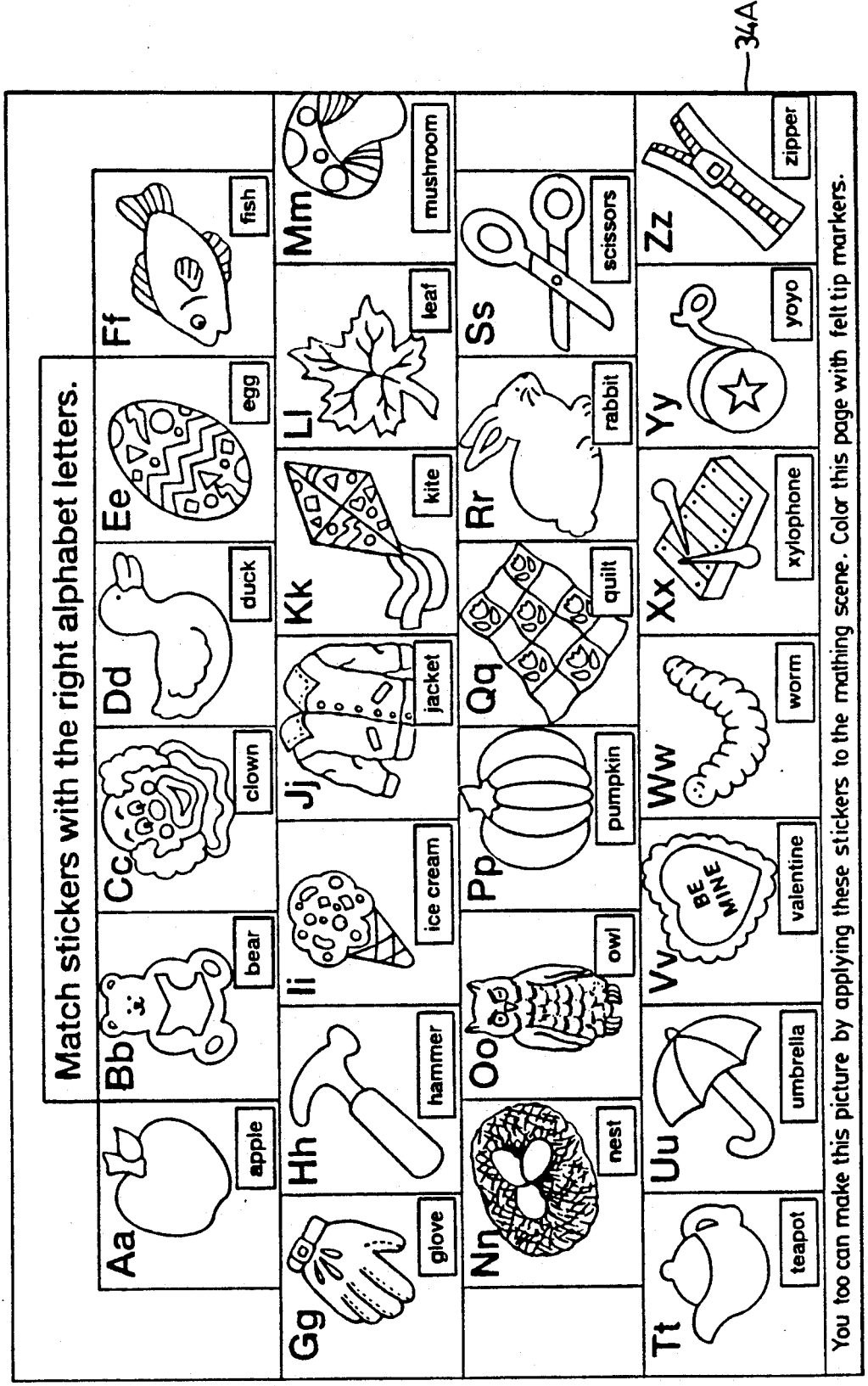
FIG. 7 is a plan view of a first alternate embodiment of the instructional page of FIG. 4.
Figure 8:
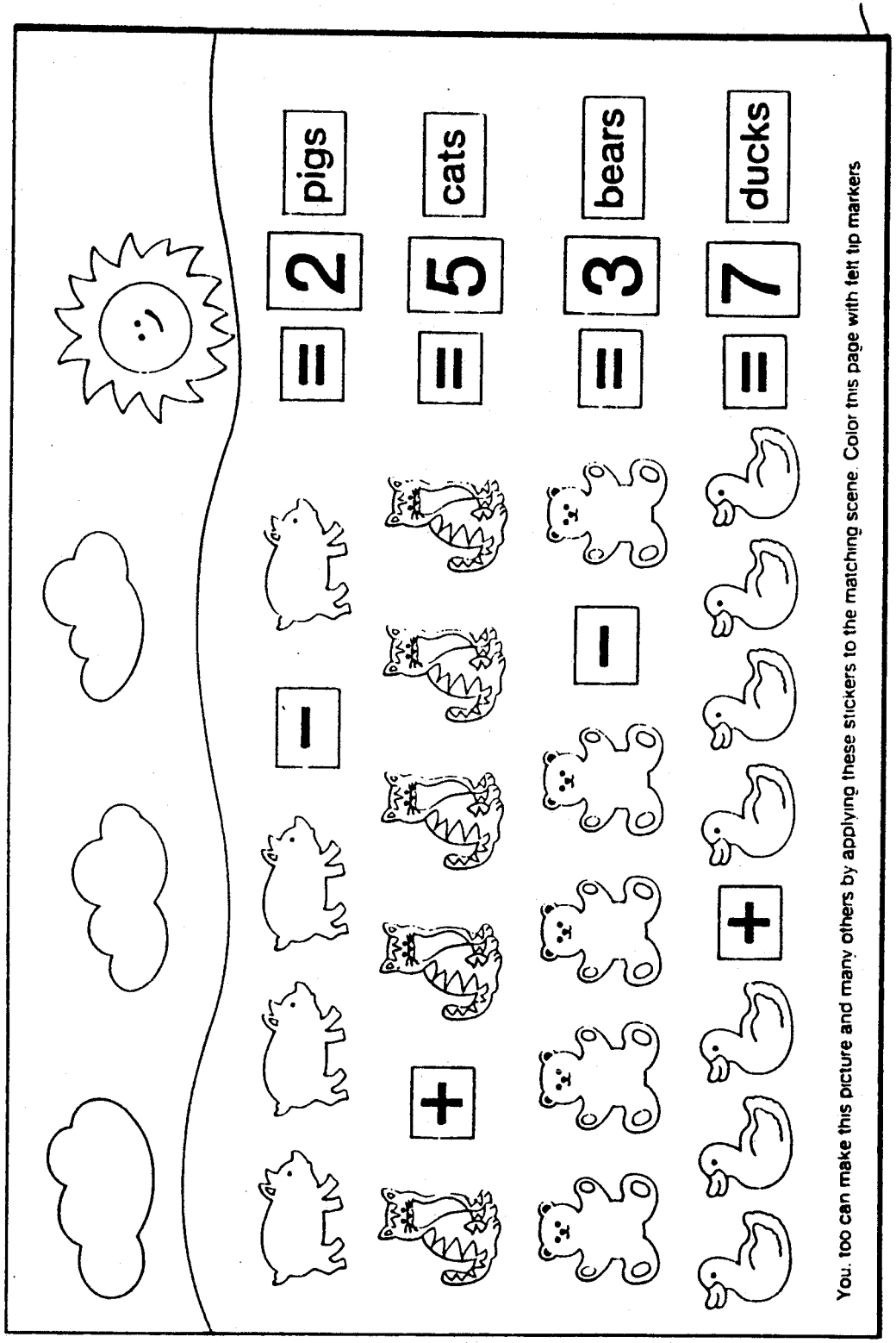
FIG. 8 is a plan view of a second alternate embodiment of the instructional page of FIG. 4.

The pages 24 of the sticker book 18 comprise at least one series of sticker, scene and instructional pages 30, 32 and 34, respectively, shown in greater detail in FIGS. 2, 3 and 4, respectively. Referring first to FIG. 2, the sticker page 30 contains numerous pre-pasted or adhesive backed stickers 36. In the preferred embodiment, and making further reference to FIG. 2A, the sticker page 30 is constructed of a generally flexible sticker paper 40 having an adhesive backing or coating on a bottom or inner side 42 of the paper 40. The stickers 36 are die-cut in the paper 40. A generally flexible substrate sheet 44 underlies the first side 42 of the sticker paper 40. An inner side 46 of the substrate sheet 44 has a release coating to facilitate removal of the stickers 36 off the substrate 44. It will be appreciated that the stickers 36 may be of any desired shape and are preferably colored. For both the paper 40 and the substrate sheet 44, a suitable paper is that supplied by Fasson and known as "white hi-gloss R128 with 40 pound liner", although good results have been achieved using a "white hi-gloss 2100" paper from Mactac, for example. In each case, the front or visible side of the sticker page 40 and the inner side of substrate sheet 44 are very glossy. The other side of each is much less glossy.

Referring now to FIG. 3, the scene page 32 has a scene or illustration printed in color thereon onto which the stickers 15 are to be transferred. For example areas 48 of the scene page 32 may be printed in dark green, areas 50 in light green, area 52 in dark brown (to simulate earth) but showing green plants 54, area 56 may be printed in light brown with dark green stripes 58, and area 59 may be blue (to simulate sky). The scene page 32 has a release or glossy coating on its surface so that the stickers 36 may be removed from the scene page 32 for reuse with minimal or no damage to the stickers 36, to their adhesive, or to the scene page 32. A suitable paper, for example, is an "eight point tag coated two sides" supplied by Intercity. The particular release coatings used are conventional glossy coatings and are well known in the field.

Referring to FIG. 4, the instructional page 34 shows in black and white outline the scene on the scene page 32, together with one suggested arrangement of the stickers 36 as they could be pasted on the scene page 32. Hence, the instructional page acts as a teaching guide for the user of the book, usually a child, to show the child how the stickers should be placed on the scene page 32.

In use, a sticker 36 is removed from the sticker page 30 and is stuck onto the color scene on the scene page 32 while using the instructional page 34 as a guide for proper or preferred placement of the sticker. This process is repeated until all of the stickers 36 have been removed from the sticker page 30 and stuck to the scene page 32. The scene may be changed by rearranging one or more of the stickers 36 on the scene page 32 as often as the user desires. In addition, the black and white scene on the instructional page 34 may be colored, either before, during or after the above described transfer of stickers.

The sticker book normally promotes a dual purpose, that of a fun activity for children and a teaching or learning tool. For example, with reference to FIGS. 2 to 4, a child can have fun sticking the stickers 36 onto the color scene and coloring the black and white scene while gaining some appreciation for a farm and its animals. FIGS. 5 to 8 show, for example, how the sticker book 1 may be adapted to teach the alphabet and arithmetic. The stickers 36A on the sticker page 30A (FIG. 5) are placed in the box with the appropriate letter on the scene page 32A (FIG. 6) using the instructional page 34A (FIG. 7) as a guide. A similar arrangement may be constructed for learning arithmetic as illustrated by a sample instructional page 34B in FIG. 8.

Various arrangements are possible for organizing the sticker book 18. Although the instructional page 34 may stand alone and be arranged consecutively after (or before) the sticker and scene pages 30, 32, preferably the instructional page is printed on the back side of its associated sticker page as shown in FIG. 1. There are several advantages to this arrangement. Firstly, when the instructional page is located on the back of the sticker page, the child cannot look at both pages at the same time, and must therefore develop his or her memory when using the instructional page 34. Secondly, since the instructional page and sticker page are located together (on opposite sides of the same sheet), collation and organization of the sticker book is simplified.

Preferably for at least some of the scenes in the sticker book, the sticker page 30 and scene page 32 face each other, and the instructional page 34 is not visible (since it is on the back side of the sticker page) when the scene page is being viewed. This will particularly help to exercise the child's memory, since as mentioned the child will not be able to view the instructional page when engaged in the activity of removing the stickers and sticking them on the scene page.

In addition, the instructional page 34, since it contains a representation of the scene and stickers in black and white outline, is adapted to be colored using marking instruments such as colored felt tip markers. Since its exposed surface 60 is less glossy than its inside surface 46 (it is coated only on one side), it is well adapted to receiving coloring. When the instructional page 34 is on the back side of the sticker page 30 and remote from the scene page 32, the user when engaged in the act of coloring will not be able to see the colors on the sticker page 30 or scene page 32 and will therefore further develop his/her memory (or imagination).

However it is also preferred that for at least some of the pages in the book, the instructional page 34 be adjacent and facing the scene page 32, as shown in FIG. 1. This will make application of the stickers for these pages particularly simple, since the instructions will be adjacent the scene page. It will also facilitate coloring of the instructional page since the completed scene page will be immediately adjacent and facing the instructional page for easy reference by the user. This provides a simple arrangement for showing and teaching the child how to use the book, so that the child can then carry out the more difficult operations when the instructional page is not readily visible.

Figure 9:
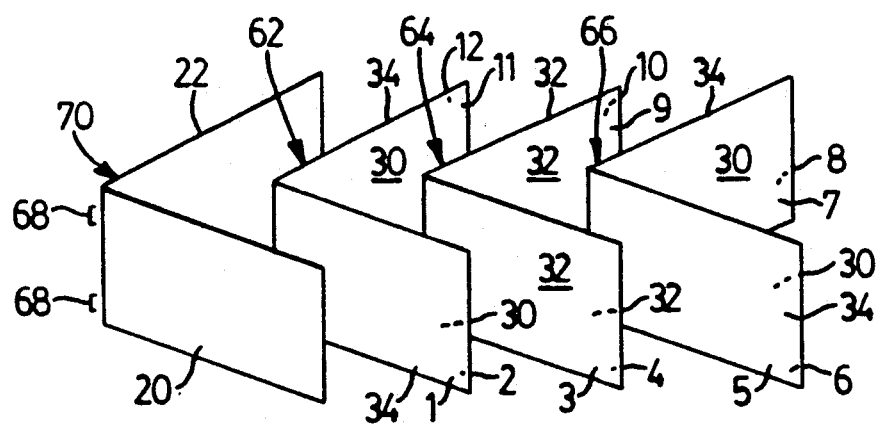
FIG. 9 is a perspective view of a preferred construction of the FIG. 1 book.

To implement the above arrangement, the book may conveniently contain 12 pages, arranged as shown in FIG. 9. The pages are numbered as 1 to 12 and are arranged as listed below:

| Page 1 | Instructional page 34 |
| --- | --- |
| Page 2 | Sticker page 30 |
| Page 3 | Scene page 32 |
| Page 4 | Scene page 32 |
| Page 5 | Instructional page 34 |
| Page 6 | Sticker page 30 |
| Page 7 | Sticker page 30 |
| Page 8 | Instructional page 34 |
| Page 9 | Scene page 32 |
| Page 10 | Scene page 32 |
| Page 11 | Sticker page 30 |
| Page 12 | Instructional page 34 |

Preferably the pages are formed (FIG. 9) as double sheets, folded in their centres, so that only three double sheets 62, 64 and 66 need be used. Sheets 62 and 66 each contain sticker pages 30 on one side and instructional pages 34 on the other side, while central sheet 64 (sandwiched between sheets 62, 66) is printed on all four surfaces as a scene page 32. The book is assembled by staples 68 inserted through the centres of the sheets 62, 64, 66 and through a cover sheet 70 containing the covers 20, 22.

The arrangement described above makes production of the sticker book particularly simple, since the sticker pages 30 are in all cases backed by and associated with their corresponding instructional pages 34, and since the scene pages 32 can be separately printed. In addition, since each sheet 64 of scene pages 32 (displaying four scenes on two double-sided pages) requires two sheets 62, 66 of sticker/instructional pages (each such sheet consisting of two sticker pages and two instructional pages), each scene sheet 64 can be sandwiched between a pair of sticker/instructional sheets 62, 66.

Thus, during manufacture, each scene sheet 64 is printed on both its sides. Each instruction sheet 62, 66 is formed of two sheets, namely a sheet of sticker paper on which stickers are printed and a sheet on which instructions are printed.

After the back of the sticker sheet is coated with adhesive, the adhesive and instruction sheets are brought together to form a single sticker/instruction sheet 62 or 66, and the stickers are then die cut in conventional manner.

Although the present invention has been described with reference to a preferred embodiment thereof, it will be appreciated by those skilled in the art that various alterations and modifications may be carried out without departing from the scope of the invention.

I claim:

1. A sticker book comprising:
   (i) a sticker page containing a plurality of removable adhesively backed stickers;
   (ii) a scene page associated with said sticker page and having a scene printed in color thereon and a release coating for receiving said stickers;
   (iii) an instructional page associated with said sticker and scene pages and showing, in black and white outline, said scene on said scene page and one arrangement of said stickers on said scene; so that a user of said book may remove one of said stickers from said sticker page and transfer said sticker onto said scene page as shown on said instructional page, and said transfer may continue until all of said stickers have been placed on said scene page;
   (iv) said instructional page having a surface adapted to receive coloring from a coloring instrument, so that said instructional page may be colored by said user;
   (v) said sticker and instructional pages being located on a common sheet and being located back to back on opposite sides of said sheet.

2. The sticker book of claim 1 wherein for at least some of the pages therein, a sticker page associated with a scene page faces such associated scene page, and the instructional page associated with such scene page is therefore not visible when said last mentioned sticker page and scene page are opened.

3. The sticker book of claim 2 and containing at least three sheets, each sheet having first and second sides and a centre and being folded at its centre to form four pages, one of said sheets containing four said scene pages and hence being a scene sheet, and each of the other two of said sheets containing two sticker pages on one of its sides and two instructional pages on the other of its sides and hence being a sticker/instructional page sheet.

4. The sticker book of claim 3 wherein said scene sheet is located between said sticker/instructional sheets.

5. The sticker book of claim 4 wherein:
   (i) said sticker page comprises a sticker paper having an adhesive coating on a first side thereof, said sticker paper being die-cut to form said stickers; and
   (ii) said instructional page comprises a flexible substrate wherein a first side of said substrate has a release coating and underlies said first adhesive coated side of said sticker page, and said black and white outline is located on a side of the substrate opposite the sticker paper for coloring by said user.

6. A method of using a sticker book comprising the steps of:
   (i) removing a sticker from a sticker page of said sticker book;
   (ii) placing said sticker on a color scene located on a scene page of said book by following instructions for said placement on an instructional page of said book which shows in black and white outline one arrangement of said stickers on said scene;
   (iii) repeating steps (i) and (ii) until all of said stickers have been removed from said sticker page and have been placed on said scene page;
   (iv) and coloring at least a portion of said instructional page.

* * * * *